(12) United States Patent
Leone

(10) Patent No.: US 7,972,554 B2
(45) Date of Patent: Jul. 5, 2011

(54) AIR CARTRIDGE DEVICES AND METHODS OF USING SAME

(75) Inventor: Robert Leone, Gray, ME (US)

(73) Assignee: Nestle Waters Management & Technology, Issy-les-Moulineaux (FR)

( * ) Notice: Subject to any disclaimer, the term of this patent is extended or adjusted under 35 U.S.C. 154(b) by 833 days.

(21) Appl. No.: 11/923,329

(22) Filed: Oct. 24, 2007

(65) Prior Publication Data

US 2009/0108506 A1     Apr. 30, 2009

(51) Int. Cl.
*B29C 49/58*     (2006.01)

(52) U.S. Cl. ......... 264/537; 29/401.1; 264/39; 264/523; 425/535

(58) Field of Classification Search .................. 425/529, 425/535; 264/39, 523, 537; 29/401.1; 137/271
See application file for complete search history.

(56) References Cited

U.S. PATENT DOCUMENTS

| | | | |
|---|---|---|---|
| 3,880,640 A | 4/1975 | Jenkins | |
| 4,234,299 A | 11/1980 | Kuenzig et al. | |
| 4,631,020 A | 12/1986 | Frankenberg et al. | |
| 4,929,410 A | 5/1990 | Meyer et al. | |
| 5,156,184 A * | 10/1992 | Kolchinsky | 137/454.5 |
| 5,205,531 A * | 4/1993 | Kolchinsky | 251/30.04 |
| 5,271,599 A * | 12/1993 | Kolchinsky et al. | 251/30.04 |
| 5,423,347 A * | 6/1995 | Weber | 137/454.5 |
| 5,454,707 A * | 10/1995 | Mitchell et al. | 425/529 |
| 5,660,902 A * | 8/1997 | Unterlander et al. | 264/523 |
| 5,792,491 A | 8/1998 | Chaure | |
| 5,795,598 A | 8/1998 | Wohlgemuth et al. | |
| 5,842,679 A * | 12/1998 | Kolchinsky | 251/30.04 |
| 6,142,171 A * | 11/2000 | Hancock | 137/271 |
| 6,464,486 B1 | 10/2002 | Barray et al. | |
| 6,824,732 B2 | 11/2004 | Cobiski et al. | |
| 7,107,769 B2 * | 9/2006 | Batchelor | 29/401.1 |
| 7,165,956 B2 | 1/2007 | Santais et al. | |
| 2005/0175731 A1* | 8/2005 | Chiang | 425/535 |

OTHER PUBLICATIONS

Derwent abstract 2002-645424 of German reference DE 20203939 U1, dated Jun. 20, 2002 and the accompanying figure.*

* cited by examiner

*Primary Examiner* — Robert B Davis
(74) *Attorney, Agent, or Firm* — K&L Gates LLP

(57) ABSTRACT

Air cartridge devices and methods of using the air cartridge devices are provided. In an embodiment, the present disclosure provides an air cartridge device comprising an elongated cylindrical shaft defining a first elongated end portion and a second elongated end portion. The second elongated end portion can defining one or more apertures. The air cartridge device can be incorporated into a blow molding apparatus for blow molding bottles.

15 Claims, 3 Drawing Sheets

AIR CARTRIDGE DEVICES AND METHODS OF USING SAME

BACKGROUND

The present disclosure relates to blow molding. More specifically, the present disclosure relates to air cartridge devices for use in conjunction with blow molding apparatuses.

Blow molding machines can produce plastic articles such as bottles and packages in a wide variety of shapes for diverse applications. For example, blow molding machines can make heat resistant bottles, wide mouth packages and flat or complex shaped bottles. The current practice for blowing a bottle using a typical blow molding machine is that a portion of the blow molding machine is lowered and seals on top of a split mold cavity. High pressure compressed air (30 to 40 bars) is directed through a large cavity that is part of the blowing inlet cylinder and blowing nozzle outlet of the blow molding machine and into a heated preformed bottle to form the final bottle. Once the bottle is formed, the high pressure air in the bottle, blowing cylinder and nozzle cavity is exhausted to the atmosphere. This practice is very inefficient because the volume of high pressure compressed air used to form the bottle is over two times the actual volume of the bottle, and the ability to maintain a seal on top of the split mold is ineffective. A higher amount of energy is also required to fill the entire pressurized volume of the blowing cylinder and nozzle cavity.

SUMMARY

The present disclosure relates to air cartridge devices and methods of using the air cartridge devices, for example, in conjunction with blow molding apparatuses. In a general embodiment, the present disclosure provides an air cartridge device comprising an elongated cylindrical shaft defining a first elongated end portion and a second elongated end portion. The second elongated end portion defines one or more apertures.

In an embodiment, the second elongated end portion comprises an exterior surface defining a circumferential groove.

In an embodiment, the device comprises an O-ring removably attached to the circumferential groove.

In an embodiment, the elongated cylindrical shaft defines a middle elongated portion have a circumference that is greater than a circumference of the first elongated end portion and a circumference of the second elongated end portion.

In an embodiment, the second elongated end portion defines a first circular cavity.

In an embodiment, the first elongated end portion defines a first circular cavity adjacent to a second circular cavity.

In an embodiment, first elongated end portion comprises within at least one of the first circular cavity and the second circular cavity a component selected from the group consisting of a snap ring, a washer, an O-ring, a bushing and combinations thereof.

In an embodiment, the second elongated end portion defines 8 circular apertures spaced equidistantly around an external surface of the second elongated end portion.

In an embodiment, the elongated cylindrical shaft comprises a material selected from the group consisting of metal, rigid plastic and combinations thereof.

In another embodiment, the present disclosure provides a blow molding apparatus comprising a support, an air cartridge device removably attached to the support and a blow nozzle defining and inlet and an outlet. The blow nozzle is removably attached to the support. The air cartridge device comprises an elongated cylindrical shaft defining a first elongated end portion and a second elongated end portion. The second elongated end portion defines at least one aperture.

In an embodiment, the air cartridge device comprises a single unitary piece.

In an alternative embodiment, the present disclosure provides a method of retrofitting a blow molding apparatus having an inlet component and a removable blow nozzle outlet. The method comprises providing an air cartridge device comprising an elongated cylindrical shaft defining a first elongated end portion and a second elongated end portion and placing the air cartridge device within the inlet component and the removable blow nozzle outlet of the blow molding apparatus.

In an embodiment, placing the air cartridge device within the inlet component comprises inserting the first elongated end portion of the device into the inlet component of the blow molding apparatus and enclosing the second elongated end portion of the device with the blow nozzle outlet of the blow molding apparatus.

In an embodiment, the method comprises forming an alternative inlet on a portion of the blow nozzle outlet of the blow molding apparatus.

In still another embodiment, the present disclosure provides a method of blowing a bottle. The method comprises providing an air cartridge device comprising an elongated cylindrical shaft defining a first elongated end portion and a second elongated end portion and placing the air cartridge device into a blow molding apparatus. The blow molding apparatus comprises a support and a blow nozzle outlet removably attached to the support. The method further comprises placing the blow nozzle onto a split mold cavity comprising a preformed bottle and supplying air through the blow nozzle outlet to expand the preformed bottle.

In an embodiment, placing the air cartridge device into the blow molding apparatus comprises inserting a first elongated end portion of the device into the support of the blow molding apparatus and enclosing a second elongated end portion of the device with the blow nozzle outlet of the blow molding apparatus.

In an embodiment, the method comprises removing the expanded bottle from the split mold cavity.

An advantage of the present disclosure is to provide an improved air cartridge device.

Another advantage of the present disclosure is to provide an improved blow molding apparatus.

Still another advantage of the present disclosure is to provide an improved method of blowing molding.

Yet another advantage of the present disclosure is to provide an improved method of blowing preformed bottles.

Another advantage of the present disclosure is to provide a method of retrofitting a blow molding apparatus.

Additional features and advantages are described herein, and will be apparent from, the following Detailed Description and the figures.

DETAILED DESCRIPTION

The present disclosure relates to air cartridge devices and methods of using the air cartridge devices. More specifically, the present disclosure relates to air cartridge devices for use in conjunction with blow molding apparatuses. For example, a conventional blow molding apparatus generally comprises an inlet blowing cylinder and a blow nozzle outlet that have internal cavities or void spaces that consume air pressure as the blow molding apparatus is being used. By eliminating the large blowing cavities inside the inlet blowing cylinder and blow nozzle outlet, the high pressure compressed air consumed to form a molded bottle in a mold can be reduced by over 50% and the leakage resulting from sealing on top of the mold can be eliminated. This can result in a considerable amount of savings in electricity because of the reduced energy requirement for blowing air into the bottles according to embodiments of the present disclosure.

Figure 1:
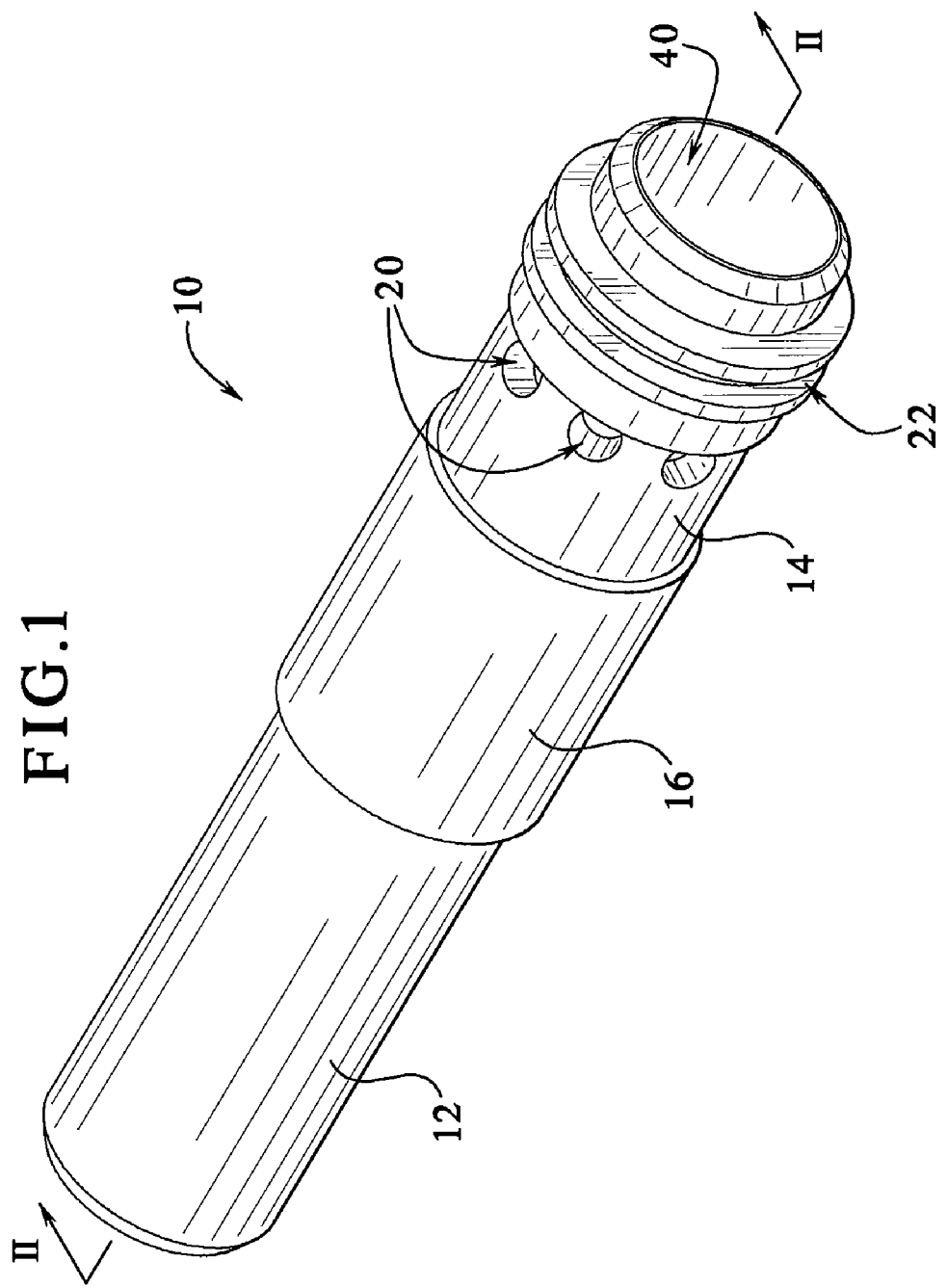
FIG. 1 illustrates a perspective view of the air cartridge device in an embodiment of the present disclosure.
Figure 2:
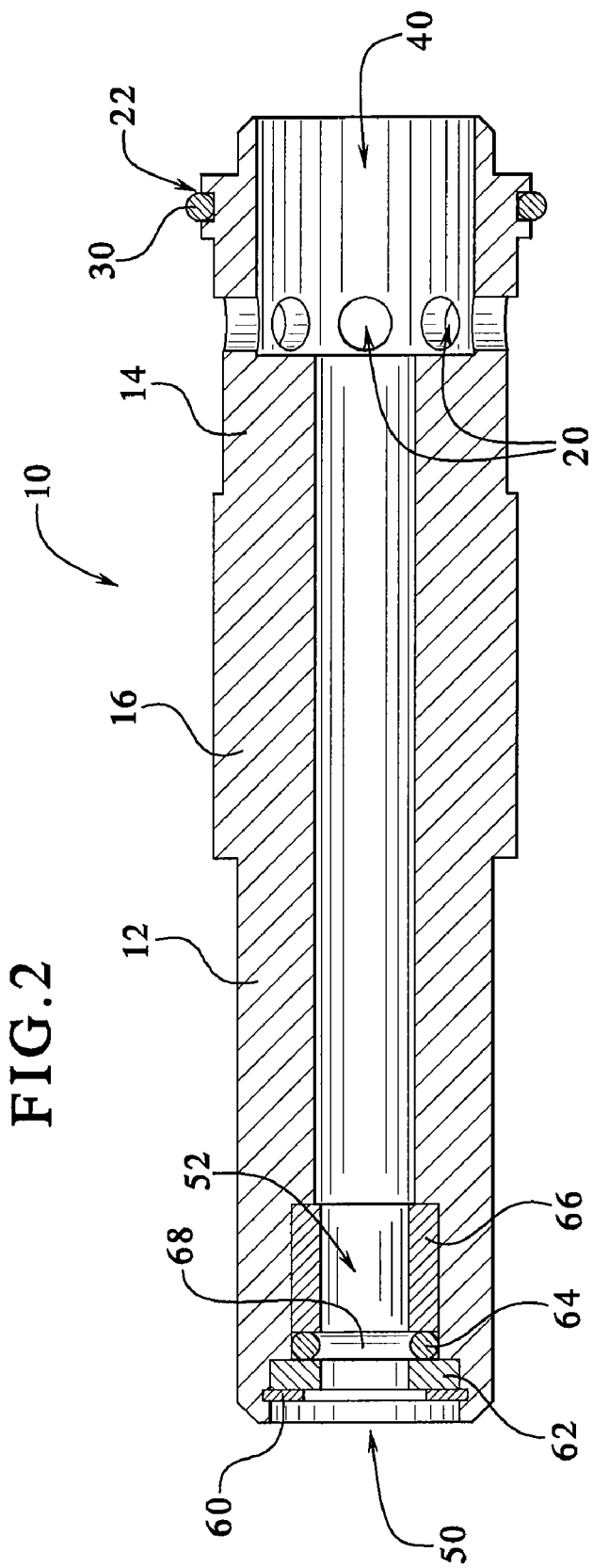
FIG. 2 illustrates a cross-section II of the air cartridge device of FIG. 1.

In a general embodiment illustrated in FIGS. 1-2, the present disclosure provides an air cartridge device 10 comprising an elongated cylindrical shaft defining a first elongated end portion 12 and a second elongated end portion 14. The second elongated end portion 12 defines one or more apertures 20. In another embodiment, the second elongated end portion defines 8 circular apertures spaced equidistantly around an external surface of the second elongated end portion.

The second elongated end portion 14 can also comprise an exterior surface defining a circumferential groove 22, for example, that is constructed and arranged to receive an O-ring 30. The O-ring 30 can be removably attached to the circumferential groove 22. The O-ring 30 can provide an air tight seal between the device 10 and any external fittings surrounding the device 10.

The elongated cylindrical shaft can further define a middle elongated portion 16 have a circumference that is greater than a circumference of the first elongated end portion 12 and a circumference of the second elongated end portion 14. In another embodiment, the device comprises a first elongated end portion and the circumference of the second elongated end portion without a raised middle elongated portion.

In an embodiment as illustrated in FIGS. 1-2, the second elongated end portion 14 defines a first circular cavity 40. The first elongated end portion 12 can define a first circular cavity 50 adjacent to a second circular cavity 52. The one or more apertures 20 can, for example, allow air to flow from inside the first circular cavity 40 and/or the circular cavities 50 and 52 to outside the air cartridge device 10 (and vice versa) if one of the ends of the first and second elongated portions 12 and 14 were sealed or closed.

The first elongated end portion can comprise within at least one of the first circular cavity 50 and the second circular cavity 52 one or more components such as a snap ring 60, a washer 62, an O-ring 64, a bushing 66 and combinations thereof. The snap ring 60, a washer 62, an O-ring 64, a bushing 66 can be constructed and arranged to be removably attached inside the first circular cavity 50 and/or the second circular cavity 52. The first circular cavity 50 and/or the second circular cavity 52 can further comprise a Teflon seal 68 that prevents air flowing, for example, between the first circular cavity 50 and the second circular cavity 52. In an alternative embodiment, the cavities of the first elongated end portions and the second elongated end portions can comprise any suitable shape.

In an embodiment, the device comprises a single unitary piece (excluding the fittings such as the snap ring, a washer, an O-ring, a bushing). The elongated cylindrical shaft can comprise any suitable material such as, for example, metal, rigid plastics or polymers or combinations thereof.

The air cartridge device can be used to facilitate the rebuilding of a stretch rod seal assembly of a conventional blow nozzle and reduce labor time in preventive maintenance of seals. The current maintenance involved with replacing the stretch rod seals that are part of the blow nozzle involves removing the stretch rod. This takes an accomplished mechanic roughly 25 minutes per station. Maintenance using the device in alternative embodiments of the present disclosure can be accomplished in about a two minutes by an operator.

Figure 3:
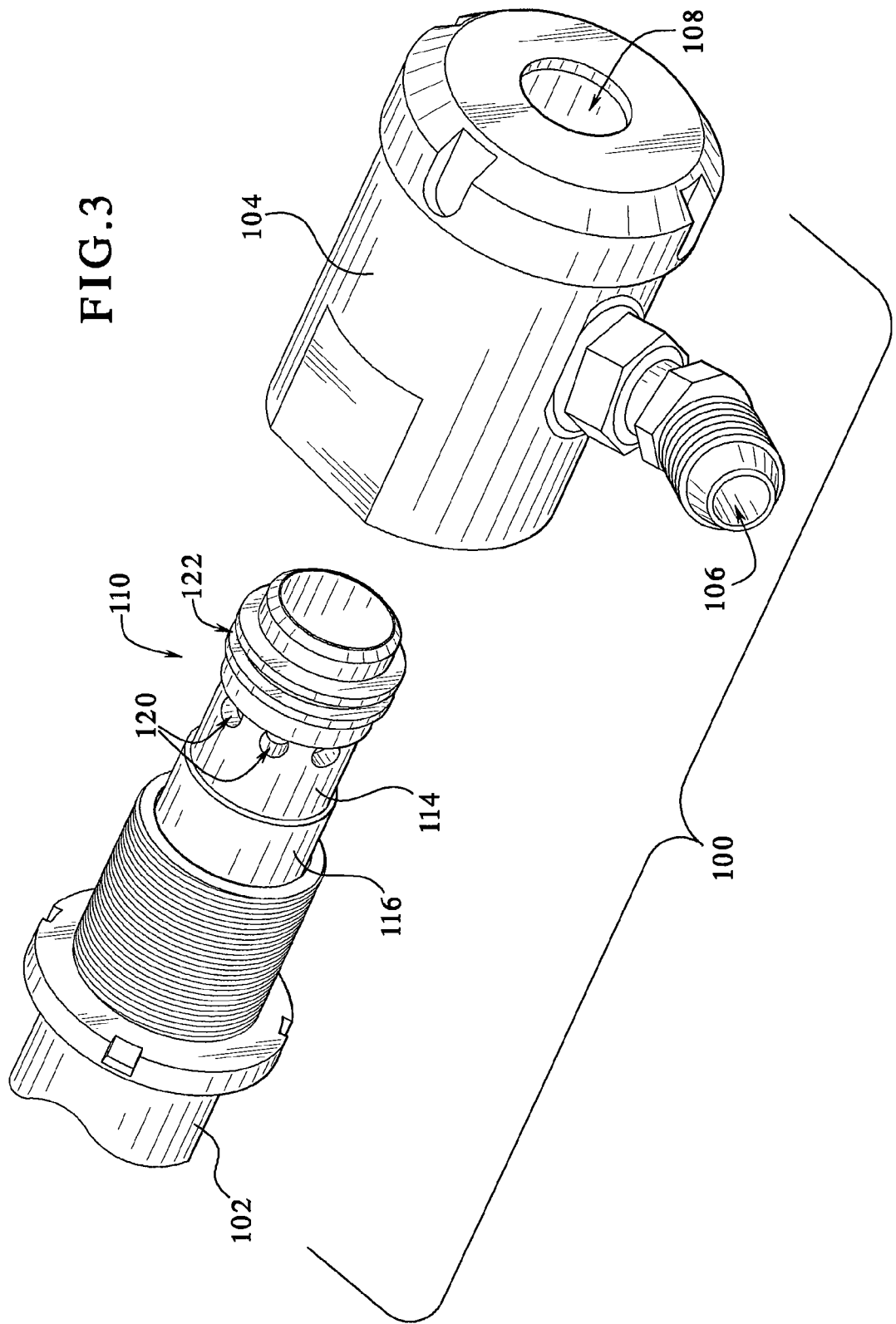
FIG. 3 illustrates a blow nozzle apparatus comprising the air cartridge device in an embodiment of the present disclosure.

In another embodiment illustrated in FIG. 3, the present disclosure provides a blow molding apparatus 100 comprising a support 102, an air cartridge device 110 removably attached to the support 100 and a blow nozzle 104 defining and inlet 106 and an outlet 108. The blow nozzle 104 is removably attached to the support 102 in any suitable manner (e.g. screw, snaps). In another embodiment, the support can comprise an inlet blowing cylinder or inlet component of a conventional blow molding apparatus (e.g. Sidel® blow-molder).

The air cartridge device 110 comprises an elongated cylindrical shaft defining a first elongated end portion (shown inserted in support 102) and a second elongated end portion 114. The second elongated end portion defines one or more apertures 120. The elongated cylindrical shaft can further define a middle elongated portion 116.

During actual operation, in an embodiment, the outlet 108 of the blow nozzle 104 is placed onto an entrance of a mold cavity (e.g. split mold cavity) comprising a preformed bottle. Air is forced into the inlet 106 of the blow nozzle 104, passes through one or more of the apertures 120 into the central passage of the air cartridge device 110 and out through the outlet 108 into the mold cavity. Consequently, the preformed bottle is pressurized and expands to the shape of the cavity mold.

In an alternative embodiment, the present disclosure provides a method of retrofitting a blow molding apparatus having an inlet component and a removable blow nozzle outlet. The method comprises providing an air cartridge device comprising an elongated cylindrical shaft defining a first elongated end portion and a second elongated end portion and placing or incorporating the air cartridge device within the inlet component and the removable blow nozzle outlet of the blow molding apparatus. For example, the air cartridge device can be incorporated in a pre-constructed cavity or internal passage formed by the inlet component and the removable blow nozzle outlet of the blow molding apparatus.

The air cartridge device can prevent air from flowing back into the inlet component or inlet blowing cylinder of the blow molding apparatus. In this regard, an inlet will have to be constructed on the removable blow nozzle outlet of the blow molding apparatus. The retrofitted blow molding apparatus can then operate by placing the outlet of the blow nozzle outlet onto an entrance of a mold cavity comprising a preformed bottle. Air is forced into the constructed inlet of the blow nozzle outlet, passes through one or more of the apertures of the air cartridge device into the central passage of the air cartridge device and out through the outlet of the blow nozzle outlet into the mold cavity. Consequently, the preformed bottle is pressurized and expands to the shape of the cavity mold. The expanded bottle can then be removed from the mold cavity using any suitable method (e.g. taking apart the split mold cavity).

The air cartridge device can dramatically reduce the dead air space inside of the blow nozzle of the conventional retrofitted blow molding apparatus (e.g. Sidel® blow-molders). For example, this device eliminates the cavity that is part of the inlet blowing cylinder and nozzle outlet and makes a seal on the top of the heated perform and not the split mold. The air cartridge device can slide into the internal cavity of the existing blow nozzle apparatus as previously described and eliminate the blow nozzle and cylinder cavities.

The air cartridge device can be self aligning to what ever size preformed neck is being used and can set its position on the preformed bottle where it does not need to move any more. This eliminates O-ring wear. O-rings can be used to seal the high pressure compressed air from entering the nozzle cavity and nozzle cylinder. High pressure compressed air can be directed to the side of the blow nozzle outlet, for example, via a stainless steel braided Teflon hose attached to an inlet of the blow nozzle outlet. The O-rings of the air cartridge device can prevent leakage of air. As the blow nozzle outlet is lowered onto the preformed bottle, the air cartridge device is positioned on the neck of the preformed bottle and maintains a seal. High pressure compressed air from one or more blowing valves then passes from the valves to the hose and enters the air cartridge device where it is diffused and directed into the preformed bottle to form the final bottle.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A blow molding apparatus comprising:
   a support;
   an air cartridge device removably attached to the support, the air cartridge device comprising an elongated cylindrical shaft defining a first elongated end portion and a second elongated end portion, the second elongated end portion defining at least one aperture and comprising an exterior surface defining a circumferential groove; and
   a blow nozzle defining an inlet and an outlet, the blow nozzle removably attached to the support.

2. The apparatus of claim 1, wherein the air cartridge device comprises a single unitary piece.

3. The apparatus of claim 1 comprising an O-ring removably attached to the circumferential groove.

4. The apparatus of claim 1, wherein the second portion defines a first circular cavity.

5. The apparatus of claim 1, wherein the first portion defines a first circular cavity adjacent to a second circular cavity.

6. The apparatus of claim 5, wherein the first elongated end portion comprises within at least one of the first circular cavity and the second circular cavity a component selected from the group consisting of a snap ring, a washer, an O-ring, a bushing and combinations thereof.

7. The apparatus of claim 1, wherein the second elongated end portion defines 8 circular apertures spaced equidistantly around an external surface of the second elongated end portion.

8. A method of retrofitting a blow molding apparatus having an inlet component and a removable blow nozzle outlet, the method comprising:
   providing an air cartridge device comprising an elongated cylindrical shaft defining a first elongated end portion and a second elongated end portion; and
   placing the air cartridge device within the inlet component and the removable blow nozzle outlet of the blow molding apparatus.

9. The method of claim 8, wherein placing the air cartridge device within the inlet component comprises inserting the first elongated end portion of the device into the inlet component of the blow molding apparatus and enclosing the second elongated end portion of the device with the blow nozzle outlet of the blow molding apparatus.

10. The method of claim 8 comprising forming an alternative inlet on a portion of the blow nozzle outlet of the blow molding apparatus.

11. The method of claim 8, wherein the elongated cylindrical shaft comprises a single unitary piece.

12. The method of claim 8, wherein the second elongated end portion defines 8 circular apertures spaced equidistantly around an external surface of the second elongated end portion.

13. A method of blowing a bottle, the method comprising:
   providing an air cartridge device comprising an elongated cylindrical shaft defining a first elongated end portion and a second elongated end portion;
   incorporating the air cartridge device into a blow molding apparatus, the blow molding apparatus comprising a support and a blow nozzle outlet removably attached to the support;
   placing the blow nozzle onto a split mold cavity comprising a preformed bottle; and
   supplying air through the blow nozzle outlet to expand the preformed bottle.

14. The method of claim 13, wherein incorporating the air cartridge device comprises inserting a first elongated end portion of the device into the support of the blow molding apparatus and enclosing a second elongated end portion of the device with the blow nozzle outlet of the blow molding apparatus.

15. The method of claim 13 comprising removing the expanded bottle from the split mold cavity.

* * * * *